United States Patent [19]

Funaki et al.

[11] Patent Number: 5,145,950
[45] Date of Patent: Sep. 8, 1992

[54] METHOD OF STORING FOOD OR PLANT MATERIALS BY WRAPPING WITH A STRETCHED SYNDIOTACTIC POLYSTYRENE FILM

[75] Inventors: Keisuke Funaki, Ichihara; Komei Yamasaki, Sodegaura, both of Japan

[73] Assignee: Idemitsu Kosan Co., Ltd., Tokyo, Japan

[21] Appl. No.: 651,043

[22] Filed: Feb. 4, 1991

Related U.S. Application Data

[63] Continuation-in-part of Ser. No. 390,298, Aug. 7, 1989, abandoned.

[30] Foreign Application Priority Data

Aug. 31, 1988 [JP] Japan ................. 63-215096

[51] Int. Cl.$^5$ ........................... B65B 55/00; C08J 5/18
[52] U.S. Cl. ..................... 528/481; 528/503; 526/346; 526/348.1; 426/396; 426/415; 427/4; 264/291; 264/331.17
[58] Field of Search ............. 526/348.1, 346, 347.2; 264/291, 331.17; 528/481, 503; 426/396, 415; 427/4

[56] References Cited

U.S. PATENT DOCUMENTS 3,069,406 12/1962 Newman et al. ............ 526/348.1 X
4,824,629 4/1989 Seitz et al. ..................... 264/291

FOREIGN PATENT DOCUMENTS 0342234 11/1989 European Pat. Off. ......... 526/347.2
63-77905 4/1988 Japan ............................... 526/347.2

*Primary Examiner*—Fred Teskin
*Attorney, Agent, or Firm*—Oblon, Spivak, McClelland, Maier & Neustadt

[57] ABSTRACT

A method of wrapping plant materials for storage by wrapping the plant materials with a food wrapping material obtained by stretching a styrene-based polymer film with mainly syndiotactic configuration. The wrapping material is transparent, has gloss and is excellent in physical properties such as gas permeability and heat resistance making it very useful in the method for wrapping material such as vegetables and fruits requiring permeation and diffusion of gases such as oxygen and carbon dioxide.

15 Claims, 1 Drawing Sheet ly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.
METHOD OF STORING FOOD OR PLANT MATERIALS BY WRAPPING WITH A STRETCHED SYNDIOTACTIC POLYSTYRENE FILM This application is a Continuation-In-Part, of application Ser. No. 07/390,298, filed Aug. 7, 1989, now abandoned.

BACKGROUND OF THE INVENTION

1. Field of the Invention

The present invention relates to a food wrapping material and a process for production thereof. More particularly, it is concerned with a food wrapping material on which is transparent and is excellent in gas permeability, and a process for efficiently producing the food wrapping material.

2. Description of Related Arts

In recent years, a plastic film has been increasingly used for wrapping of foodstuffs from a hygienical standpoint. Even vegetables and fruits to wrapping of which no attention has been paid, are now on the market in the form that is wrapped with a plastic film. For wrapping of such vegetables or fruits, a film having good gas (e.g., oxygen or carbon dioxide) permeability rather than gas sealability required for conventional wrapping materials, is preferably used from a standpoint of aspiration of vegetables or fruits.

Heretofore, an atactic polystyrene film has been used for such food wrapping. It has been desired, however, to develop a film which is transparent and has higher gas permeability than the atactic polystyrene film.

SUMMARY OF THE INVENTION

An object of the present invention is to provide a food wrapping material.

Another object of the present invention is to provide a food wrapping material which is suitable particularly for wrapping of vegetables or fruits.

Still another object of the present invention is to provide a food wrapping material which is transparent and is excellent in gas permeability.

Further object of the present invention is to provide a process for efficiently producing the food wrapping material with high performance.

It has been found that a film obtained by stretching a styrene-based polymer with mainly syndiotactic configuration as developed by the present inventors' group (see Japanese Patent Application Laid-Open No. 104818/1987) possesses characteristics required for food wrapping.

The present invention provides a food wrapping material obtained by stretching a styrene-based polymer with mainly syndiotactic configuration.

The present invention also provides a process for producing said food wrapping material which comprises stretching a styrene-based polymer with mainly syndiotactic configuration.

The present invention also provides a method of storing plant materials including fruits or vegetables or cut flowers for an extended time by enclosing the fruit or vegetable or cut flowers with the present invention wrapping material.

DESCRIPTION OF PREFERRED EMBODIMENTS

Figure 1:
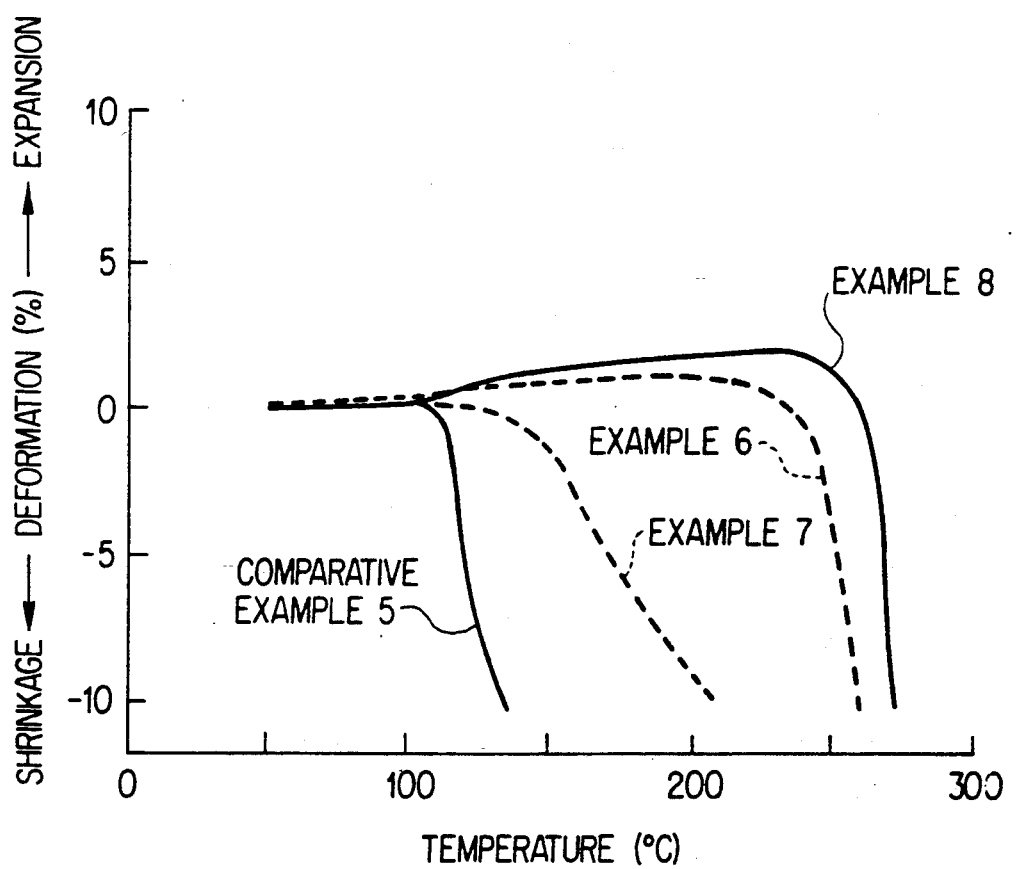
FIG. 1 is a graph showing relationships between the thermal deformation of biaxially stretched SPS films which are subjected to heat treatment under various conditions and temperatures.

A styrene-based polymer for use in production of the food wrapping material of the present invention is a styrene-based polymer having mainly syndiotactic configuration. The styrene-based polymer having mainly syndiotactic configuration means that the polymer has a stereostructure with a configuration that is mainly syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope ($^{13}$C-NMR method). The tacticity as determined by the $^{13}$C-NMR method can be indicated in terms of proportions of structural units continuously connected to each other, i.e., a racemic diad in which two structural units are connected to each other, a racemic triad in which three structural units are connected to each other, or a racemic pentad in which five structural units are connected to each other. Styrene-based polymers having mainly syndiotactic configuration of the present invention include polystyrene, poly(alkylstyrene), poly(halogenated styrene), poly(alkoxystyrene), poly(vinyl benzoate) and the mixtures thereof, and copolymers containing the above segments as the main component, having such a syndiotacticity that the proportion of racemic diad is at least 75% and preferably at least 85%, or the proportion of racemic pendad is at least 30% and preferably at least 50%.

In case of styrene-based polymers with low syndiotacticity, the improvement in physical properties by stretching treatment cannot be expected so much.

The above poly(alkylstyrene) includes poly (methylstyrene), poly(ethylstyrene), poly(isopropylstyrene), poly(tert-butylstyrene) and the like. Specific examples of the poly(halogenated styrene) are poly(chlorostyrene), poly(bromostyrene), poly(fluorostyrene) and the like. The poly(alkoxystyrene) includes poly(methoxystyrene), poly(ethoxystyrene) and the like. The most preferred styrene-based polymers are polystyrene, po- The styrene-based polymer used in the present invention is not critical for its molecular weight, but preferably has a weight average molecular weight of at least 10,000, most preferably at least 50,000. If it is less than 10,000, stretching treatment of the styrene-based polymers cannot be sufficiently performed.

The molecular weight distribution is not critical, and the styrene-based polymers in various range of molecular weight distribution can be used.

The styrene-based polymer with mainly syndiotactic configuration has a melting point of 160° to 310° C. and is much superior in heat resistance to conventional atactic styrene-based polymers.

Such styrene-based polymers with mainly syndiotactic configuration can be produced by polymerizing a styrene-based monomer (corresponding to the styrene-based polymer) in an inert hydrocarbon solvent, for example, or in the absence of a solvent by the use of a catalyst comprising a titanium compound and a condensate of water and trialkylaluminum (see Japanese patent Application Laid-Open No. 187708/1987).

The styrene-based polymer with mainly syndiotactic configuration is used in production of the food wrapping material of the present invention. Various additives can be added to the styrene-based polymer with mainly syndiotactic configuration for the purpose of improving, for example, moldability or drawability. Additives include a thermoplastic resin, a rubber, an inorganic filler, an antioxidant, a nucleating agent, a plasticizer, a compatibilizer, a colorant, an antistatic agent.

Typical examples of the thermoplastic resin are styrene-based polymers such as atactic polystyrene, isotactic polystyrene, an AS resin, and an ABS resin; polyesters such as polyethylene terephthalate; polycarbonates; polyethers such as polyphenylene oxide, polysulfone and polyethersulfone; condensation type polymers such as polyamide, polyphenylene sulfide (PPS) and polyoxymethylene; acrylic polymers such as polyacrylic acid, polyacrylate and polymethyl methacrylate; polyolefins such as polyethylene, polypropylene, polybutene, poly(4-methylpentene-1), and an ethylene-propylene copolymer; and halogenated vinyl polymers such as polyvinyl chloride, polyvinylidene chloride and polyvinylidene fluoride.

Although various rubbers can be used, rubber-like copolymers containing a styrene-based compound as one component are most suitable. Typical examples are rubber (SEBS) as derived by partially or fully hydrogenating butadiene portion of a styrene-butadiene block copolymer, styrene-butadiene copolymer rubber (SBR), methyl acrylate-butadiene-styrene copolymer rubber, acrylonitrile-butadiene-styrene copolymer rubber (ABS rubber), acrylonitrile-alkyl acrylate-butadiene-styrene copolymer rubber (AABS), methyl methacrylate-alkyl acrylate-styrene copolymer rubber (MAS), methyl methacrylate-alkyl acrylate-butadiene-styrene copolymer rubber (MABS), and the like. These rubber-like copolymers containing a styrene-based compound as one component thereof has good compatibility in the styrene-based polymer with mainly syndiotactic configuration because they have a styrene unit. Therefore, they can markedly improve the physical properties of the material of the present invention.

Other rubbers which can be used include natural rubber, polybutadiene, polyisoprene, polyisobutylene, neoprene, ethylene-propylene copolymer rubber, polysulfide rubber, thiokol rubber, acrylic rubber, urethane rubber, silicone rubber, epichlorohydrin rubber, polyether ester rubber, and polyester ester rubber.

The inorganic filler is not critical in shape and may be fibrous, granular or powdery. Examples of fibrous inorganic filler are glass fibers, carbon fibers, and alumina fibers. Examples of granular or powdery inorganic fillers are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

As the antioxidant, various kinds can be used in the present invention, but particularly preferable are phosphorus antioxidants including monophosphites and diphosphites, and phenolic antioxidants. Typical examples of the monophosphites are tris(2,4-di-tert-butylphenyl)phosphite, tris(mono or di-nonylphenyl)phosphite and the like.

Preferable diphosphites are the phosphorus compounds represented by the formula:

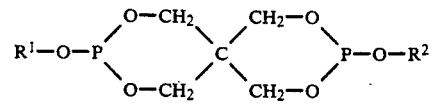

(wherein $R^1$ and $R^2$ are independently an alkyl group having 1 to 20 carbon atoms, a cycloalkyl group having 3 to 20 carbon atoms, or an aryl group having 6 to 20 carbon atoms).

Typical examples of the formula are distearylpentaerythritol diphosphite, dioctylpentaerythritol diphosphite, diphenylpentaerythritol diphosphite, bis(2,4-ditertbutylphenyl)pentaerythritol diphosphite, bis(2,6-ditertbutyl-4-methylphenyl)pentaerythritol diphosphite, dicycloexylpentaerythritol diphosphite and the like.

As for phenolic antioxidant, various known compounds can be used. Representative examples of them are 2,6-ditert-butyl-4-methylphenol, 2,6-diphenyl-4-methoxyphenol, 2,2'-methylenbis(6-tert-butyl-4-methylphenol), 2,2'-methylenebis( 4-methyl-6-(alpha-methylcyclohexyl)phenol), 1,1bis(5-tert-butyl-4-hydroxy-2-methylphenyl)butane, 2,2'-methylenebis(4-methyl-6-cyclohexylphenol), 2,2'-methylenebis(4-methyl-6-nonylphenol), 1,1,3-tris(5-tert-butyl-4-hydroxy-2-methylphenyl)butan, 2,2-bis(5-tert-butyl-4-hydroxy-2-methylphenyl)-4-n-dodecylmelcaptobutane, ethyleneglycol-bis(3,3-bis(3-tert-butyl-4-hydroxyphenyl)butylate), 1,1-bis(3,5-dimethyl-2-hydroxyphenyl)-3-(n-dodecylthio)butane, 4,4'-thiobis(6-tert-butyl-3-methylphenol), 1,3,5-tris(3,5-di-tert-butyl-4-hydroxybenzyl)-2,4,6-trimethylbenzene, 2,2-bis(3,5-di-tert-butyl-4-hydroxybenzyl)malonic acid dioctadecyl ester, n-octadecyl-3-(4-hydroxy-3,5-di-tert-butylphenyl)propionate, tetrakis(methylene(3,5-di-tert-butyl-4-hydroxyhydrocinnamate))methane and the like.

The above antioxidant is compounded in the amount of 0.0001 to 2 parts by weight, preferably 0.001 to 1 parts by weight per 100 parts by weight of the styrene-based polymer having mainly syndiotactic configuration mentioned before.

If the amount of the antioxidant compounded is less than 0.0001 parts by weight, no sufficient effect can be obtained since the molecular weight drops steeply. If it is more than 2 parts by weight, on the other hand, mechanical strength is influenced adversely.

The shape of the food wrapping material of the present invention is determined appropriately depending on the purpose of use; generally it is in a film or sheet-like form. A film-like food wrapping material, for example, can usually be produced by the following method.

That is, the aforementioned styrene-based polymer or a composition comprising the styrene-based polymer and suitable amounts of other components (hereinafter referred to as a "molding material") is usually molded by techniques such as extrusion molding, calender molding, or blow molding (in the case of blow molding, further molded by injection molding, for example) to produce a preform (film sheet, tube, parison) for stretching. In this molding, although the molding material is usually melted by heating and then molded into a desired shape by the use of a suitable molding machine, it may be molded in a softened state. The temperature to melt the molding material is usually between the melting point and a temperature 30° C. above the decomposition temperature, for example, 260° to 350° C. and preferably 280° to 330° C. in case of styrene homopolymer with mainly syndiotactic configuration. If the temperature is too high, problems such as decomposition of the molding material undesirably occur. The thickness of the preform is not critical and can be determined appropriately within the range of not more than 5 mm, preferably 3 mm to 20 μm. If the thickness is more than 5 mm, stretching becomes difficult because higher tension for stretching is required. The crystallinity of the preform is usually not more than 30%, preferably not more than 25% and more preferably not more than 20%.

In producing a preform having as low crystallinity as possible, particularly in molding a thick sheet, it is effective to quench the molten molding material at the time of molding. In this quenching, the temperature of the coolant is maintained at not more than the glass transition temperature, preferably at not more than a temperature 10° C. below the glass transition temperature, more preferably at not more than a temperature 20° C. below the glass transition temperature. It is maintained, for example, at not more than 100° C., preferably not more than 90° C. and more preferably not more than 80° C. in case of styrene homopolymer with mainly syndiotactic configuration. If the temperature of the coolant is too high, the sheet is slowly cooled and thus crystallization locally takes place, leading to difficulty in stretching.

In stretching of the preform, it is generally stretched uniaxially or biaxially at a temperature of between the glass transition temperature and the melting point of the molding material. The stretching temperature is preferably not more than a temperature 50° C. above the cold crystallization temperature. A transparent film is difficult to produce at higher temperature than a temperature 50° C. above the cold crystallization temperature. In connection with the stretch ratio (draw ratio), in the case of uniaxial stretching, the preform is stretched at a stretch ratio of at least two times, preferably at least three times, more preferably 3 to 10 times. In the case of biaxial stretching, the preform is stretched at a stretch ratio of at least 1.5 times, preferably two times in each stretching direction. If the stretch ratio is too small, a film having sufficiently improved physical properties cannot be obtained. In the case of biaxial stretching, the preform may be simultaneously stretched and sequentially stretched.

In the present invention, particularly in the case of biaxial stretching, the molding material can be molded into a biaxially stretched molding (or a biaxially stretched film, for example) by directly applying inflation molding or blow molding without forming a preform. The stretching temperature is sufficient to be 10° C. lower than the melting point. In stretch blow molding, a preform before stretching may be a hot parison or a cold parison. In this inflation molding or stretch blow molding, if the blow up ratio is made small, monoaxial stretching is attained.

The film thus obtained has a thickness of 5 to 100 μm, preferably 10 to 50 μm, and is excellent in gas permeability and further is transparent, has gloss and has a sanitary feeling. Thus the film is particularly effective as a wrapping material for foodstuffs (e.g., vegetables or fruits) requiring permeation or diffusion of gases such as oxygen and carbon dioxide. When moldings obtained is in a form of bottle, its thickness is 30 to 1000 μm, preferably 100 to 800 μm.

In the present invention, moldings such as the film obtained by stretching can further be subjected to heat treatment. This heat treatment is carried out by heating the film in a tension state at a temperature ranging between the glass transition temperature and the melting point of the styrene-based polymer, e.g., from about 120° C. to 270° C. for a time of about 2 to 600 seconds. Preferably, the heat treatment conditions are a temperature in the range of about 150° C. to 270° C. for a time of about 2 to 400 seconds and, most preferably a temperature of 200° C. to 270° C. for 2 to 60 seconds. This heat treatment more increases heat resistance, dimensional stability, chemical resistance and gas permeability of the wrapping material, e.g., a film.

A further advantage to heat treatment for attaining the function of the film as a food wrap, is the reduction in residual styrene monomer in the film. This is extremely important from a hygiene point of view when the film is used as wrap in contact with food.

The present invention provides a wrapping material, e.g., a styrene-based polymer film, which is transparent, has gloss, and is excellent in physical properties such as gas permeability, and heat resistance. Accordingly, the wrapping material of the present invention is very useful as a wrapping material for foodstuffs such as vegetables and fruits, requiring permeation and diffusion of gases such as oxygen and carbon dioxide.

The present invention provides a method, a method of storing plant materials including fruits or vegetables or cut flowers for an extended time by enclosing the fruit or vegetable or cut flowers with the present invention wrapping material.

The present invention is described in greater detail with reference to the following examples.

REFERENCE EXAMPLE 1

Production of Polystyrene with Syndiotactic Configuration

Two liters of toluene as a solvent, 1 mmol of cyclopentadienyltitanium trichloride and 0.8 mol as aluminum atom of methylaluminoxane as catalyst components were placed in a reactor. Three point six liters of styrene was introduced into the reactor at 20° C. and polymerized for one hour.

After completion of the reaction, the product was washed with a mixture of hydrochloric acid and methanol to decompose the catalyst components, and then dried to obtain 330 g of a styrene-based polymer (polystyrene). This polymer was subjected to Soxhlet extraction with methyl ethyl ketone as a solvent to obtain an extraction residue of 95% by weight. In this polymer, the weight average molecular weight was 290,000, the number average molecular weight was 158,000, and the melting point was 270° C. In a $^{13}$C-NMR analysis (solvent: 1,2-dichlorobenzene) of the polymer, an absorption peak ascribable to syndiotactic configuration was observed at 145.35 ppm. The syndiotacticity in racemic pentad as calculated from the peak area was 96%.

EXAMPLE 1

The polystyrene obtained in Reference Example 1 was mixed with 0.1 part by weight of bis(2,4-di-tert-butylphenyl) epntaerythritol diphosphite and 0.1 part by weight of tetrakis(methylene(3,5-di-tert-butyl-4-hydroxyhydrocinnamate)) methane as antioxidants, and the resulting mixture was pelletized by extruding with a twin-screw extruder (diameter: 40 mm).

The pellets thus obtained were introduced into a single-screw extruder (diameter: 40 mm) with a T die provided at the top thereof, and extruded under conditions of cylinder temperature of 300° C., T die temperature of 310° C., discharging amount of 4.2 kg/hr to obtain a sheet having a thickness of 400 μm. At this time, the surface temperature of a roll for cooling the sheet was 30° C.

The original sheet (preform) for stretching thus obtained was transparent and had a density of 1.04 g/m³, a glass transition temperature of 100° C. and a crystallinity of 15%.

This sheet was stretched in TD and MD at the same time each to 3 times the original length at a stretching temperature of 120° C. The stretched film was fixed with a grid-like fixing device and then was subjected to heat treatment at 250° C. for 30 seconds. The film thickness was 45 μm. The film was measured for coefficient of oxygen permeation, haze and tensile strength, and the results are shown in Table 1.

COMPARATIVE EXAMPLE 1

A film was produced in the same manner as in Example 1 except that the original sheet was stretched in TD and MD at the same time each to 3.5 times the original length. The thickness of the film obtained was 33 μm. The film was measured for physical properties in the same manner as in Example 1, and results are shown in Table 1.

EXAMPLE 2

A film was produced in the same manner as in Example 1 except that the original sheet was stretched in TD and MD at the same time each to 3.5 times the original length. The thickness of the film obtained was 33 μm. The film was measured for physical properties in the same manner as in Example 1, and the results are shown in Table 1.

EXAMPLE 3

A film was produced in the same manner as in Example 1 except that the original sheet was stretched in TD and MD at the same time each to 4 times the original length. The thickness of the film obtained was 25 μm. The film was measured for physical properties in the same manner as in Example 1, and the results are shown in Table 1.

COMPARATIVE EXAMPLE 2

Atactic polystyrene (trade name: Idemitsu Styrol US300; weight average molecular weight: 370,000; melt index: 2 g/10 min; density: 1.05 g/cm³; produced by Idemitsu Petrochemical Co., Ltd.) was molded into a sheet at 220° C. in the same manner as in Example 1. This sheet was stretched in TD and MD at the same time each to 4 times the original length to obtain a 25 μm thick film. This film was measured for physical properties in the same manner as in Example 1, and the results are shown in Table 1.

EXAMPLE 4

The same procedure was carried out as in Example 2 except for subjecting to the heat treatment under the conditions of 150° C. for 300 sec. The results are shown in Table 1.

EXAMPLE 5

The same procedure was carried out as in Example 2 except for subjecting to the heat treatment under the conditions of 270° C. for 5 sec. The results are shown in Table 1.

COMPARATIVE EXAMPLE 3

In the presence of a catalyst comprising 1.0 mmole of a titanium catalyst component obtained by reacting 10.0 g of magnesium diethoxide with 50 ml of titanium tetrachloride, and 10 mmole of triethylaluminum, 100 ml of styrene was polymerized in a heptane at 70° C. for 2 hours. The resulting polymer was 48.7 g of an isotactic polystryrene (iPS) having a weight average molecular weight of 1,000,000.

A film was produced in the same manner as in Example 2 except for using the above isotactic polystryrene instead of the polystyrene obtained in Reference Example 1. Further, the physical properties of the resulting film was measured in the same manner as in Example 1. The results are shown in Table 1.

COMPARATIVE EXAMPLE 4

The same procedure was carried out as in Comparative Example 3 except for subjecting to the heat treatment under the conditions at 150° C. for 300 sec. The results are shown in Table 1.

EXAMPLE 6

As for the film obtained in Example 2, relation between the temperature and the thermal deformation was measured. The results are shown in FIG. 1.

EXAMPLE 7

As for the film obtained in Example 4, relation between the temperature and the thermal deformation was measured. The results are shown in FIG. 1.

EXAMPLE 8

As for the film obtained in Example 5, relation between the temperature and the thermal deformation was measured. The results are shown in FIG. 1.

COMPARATIVE EXAMPLE 5

As for the film obtained in the same manner as in Example 2 except for not subjecting to the heat treatment, relation between the temperature and the thermal deformation was measured. The results are shown in FIG. 1.

TABLE 1

| | Polymer[*1] | Stretch Ratio (times) | Heat Treatment Conditions | Coefficient Oxygen Permeation (× 10)[*2] (cc-cm/cm-sec-cmHg) | Haze (%) | Tensile Strength (kg/cm²) | Residual Styrene monomer (ppm) | Thermal deformation Temperature[*3] (°C.) |
|---|---|---|---|---|---|---|---|---|
| Example 1 | SPS | 3 × 3 | 250° C. 30 sec | 3.8 | 4 | 870 | 6 | 242 |
| Comparative Example 1 | SPS | 3.5 × 3.5 | — | 2.1 | 3 | 860 | 430 | 105 |
| Example 2 | SPS | 3.5 × 3.5 | 250° C. 30 sec | 4.0 | 3 | 920 | 4 | 240 |

TABLE 1-continued

| | Polymer[1] | Stretch Ratio (times) | Heat Treatment Conditions | Coefficient Oxygen Permeation ($\times 10$)[2] (cc-cm/cm-sec-cmHg) | Haze (%) | Tensile Strength (kg/cm$^2$) | Residual Styrene monomer (ppm) | Thermal deformation Temperature[3] (°C.) |
|---|---|---|---|---|---|---|---|---|
| Example 3 | SPS | 4 × 4 | 250° C. 30 sec | 4.5 | 2 | 980 | 3 | 238 |
| Comparative Example 2 | aPS | 4 × 4 | — | 1.0 | 2 | 690 | 530 | 95 |
| Example 4 | SPS | 3.5 × 3.5 | 150° C. 300 sec | 3.6 | 3 | 940 | 7 | 147 |
| Example 5 | SPS | 3.5 × 3.5 | 270° C. 5 sec | 5.1 | 3 | 900 | 3 | 262 |
| Comparative Example 3 | iPS | 3.5 × 3.5 | 250° C. 30 sec | — | — | — | — | — |
| Comparative Example 4 | iPS | 3.5 × 3.5 | 150° C. 300 sec | 1.5 | 5 | 740 | — | 104 |

[1]SPS: Syndiotactic polystyrene
aPS: Atactic polystyrene
iPS: Isotactic polystyrene
[2]According to ASTM D-1434-75M.
[3]2% thermal deformation temperature was measured according to TMA (Thermal Mechanical Analysis).

What is claimed is:

1. A method of storing food materials including fruits or vegetables for an extended time comprising enclosing the fruit or vegetable with a wrapping material obtained by stretching a styrene polymer with a syndiotactic configuration, said polymer having a syndiotacticity in racemic pentad of at least 30%, and thereafter subjecting the polymer to heat treatment at a temperature ranging from about 120° C. to 270° C. for about 2 to 600 seconds, while holding the polymer in a tensed state.

2. The method as claimed in claim 1, wherein the wrapping material is a film with a thickness of 5 to 1000 μm.

3. The method as claimed in claim 1, wherein the wrapping material is obtained by molding the styrene polymer into a sheet and then uniaxially or biaxially stretching the sheet.

4. The method as claimed in claim 3, wherein the sheet is uniaxially stretched to at least 2 times.

5. The method as claimed in claim 3, wherein the sheet is biaxially stretched each to at least 1.5 times.

6. The method as claimed in claim 1, wherein the wrapping material is obtained by subjecting the styrene polymer to inflation molding or stretch blow molding.

7. The method as claimed in claim 1, wherein the styrene polymer has a weight average molecular weight of at least 10,000.

8. The method as claimed in claim 1, wherein the styrene polymer has a melting point of 160° to 310° C.

9. The method of claim 1, wherein the wrapping material is obtained by heat melting said styrene polymer or a composition containing the styrene polymer, cooling the resulting molten material to form a sheet, and then subjecting the sheet to biaxially stretching by at least 1.5 times in each direction with heating.

10. The method as claimed in claim 9, wherein the heat melting temperature is between the melting point of the styrene polymer and a temperature 30° C. above the decomposition temperature.

11. The method as claimed in claim 9, wherein the cooling temperature is not higher than the glass transition temperature of the styrene polymer, and the stretching temperature is between the glass transition temperature and a temperature 50° C. above the cold crystallization temperature.

12. The method of claim 1 wherein the heat treatment is at a temperature of 200° C. to 270° C. for a time of 2 to 60 seconds.

13. A method of storing cut flowers for an extended time comprising enclosing the cut flowers with a wrapping material obtained by stretching a styrene polymer with a syndiotactic configuration, said polymer having a syndiotacticity in racemic pentad of at least 30%, and thereafter subjecting the polymer to heat treatment at a temperature ranging from about 120° C. to 270° C. for about 2 to 600 seconds, while holding the polymer in a tensed state.

14. The method of claim 13, wherein the wrapping material is a film with a thickness of 5 to 1,000 μm and is obtained by molding the styrene polymer into a sheet and then uniaxially stretching the sheet by at least 1.5 times.

15. The method of claim 13, wherein the wrapping material is a film with a thickness of 5 to 1,000 μm and is obtained by molding the styrene polymer into a sheet and then biaxially stretching the sheet by at least 1.5 times in each direction.

* * * * *